US011592967B2

(12) United States Patent
Hartmann et al.

(10) Patent No.: US 11,592,967 B2
(45) Date of Patent: *Feb. 28, 2023

(54) METHOD FOR AUTOMATICALLY INDEXING AN ELECTRONIC DOCUMENT

(71) Applicant: Bluebeam, Inc., Pasadena, CA (US)

(72) Inventors: Brian Hartmann, Simi Valley, CA (US); Peter Noyes, Sunland, CA (US)

(73) Assignee: Bluebeam, Inc., Pasadena, CA (US)

(*) Notice: Subject to any disclaimer, the term of this patent is extended or adjusted under 35 U.S.C. 154(b) by 53 days.

This patent is subject to a terminal disclaimer.

(21) Appl. No.: 17/201,340

(22) Filed: Mar. 15, 2021

(65) Prior Publication Data

US 2021/0200397 A1 Jul. 1, 2021

Related U.S. Application Data

(60) Continuation of application No. 16/037,826, filed on Jul. 17, 2018, now Pat. No. 10,976,899, which is a
(Continued)

(51) Int. Cl.
*G06F 16/00* (2019.01)
*G06F 3/0483* (2013.01)
(Continued)

(52) U.S. Cl.
CPC .............. *G06F 3/0483* (2013.01); *G06F 7/24* (2013.01); *G06F 16/319* (2019.01); *G06F 16/93* (2019.01); *G06F 40/205* (2020.01); *G06F 40/258* (2020.01)

(58) Field of Classification Search
CPC ........ G06F 3/0483; G06F 7/24; G06F 16/319; G06F 16/93; G06F 40/205; G06F 40/258
See application file for complete search history.

(56) References Cited

U.S. PATENT DOCUMENTS 5,963,967 A 10/1999 Umen et al.
5,983,171 A 11/1999 Yokoyama et al.
(Continued)

FOREIGN PATENT DOCUMENTS

JP H08137880 A 5/1996
JP H10171788 A 6/1998
(Continued)

OTHER PUBLICATIONS

Bhute et al., Text based approach for indexing and retrieval of Image and video, Mar. 2014, 12 pages.
(Continued)

*Primary Examiner* — Noosha Arjomandi
(74) *Attorney, Agent, or Firm* — Bookoff McAndrews, PLLC

(57) ABSTRACT

Generating unique document identifiers from content within a selected page region is disclosed. A selection of a first region within a first page of the documents is received from a user, and is defined by a set of first boundaries relative to the first page. A text string of a first base selection page content within the first region is retrieved from the first page. Then the retrieved text string is assigned to a page location index associated with the first page. A text string of a first replicated selection page content is retrieved from a second page. The first replicated selection page content is included in the same first region defined by the set of first boundaries relative to the second page. The retrieved text string of the first replicated selection page content is assigned to a page location index of the second page.

20 Claims, 5 Drawing Sheets

Related U.S. Application Data continuation of application No. 15/411,844, filed on Jan. 20, 2017, now Pat. No. 10,055,098, which is a division of application No. 14/171,300, filed on Feb. 3, 2014, now Pat. No. 9,588,971.

(51) Int. Cl.

| | | |
|---|---|---|
| *G06F 7/24* | (2006.01) | |
| *G06F 16/93* | (2019.01) | |
| *G06F 16/31* | (2019.01) | |
| *G06F 40/205* | (2020.01) | |
| *G06F 40/258* | (2020.01) | |

(56) References Cited

U.S. PATENT DOCUMENTS

| | | | |
|---|---|---|---|
| 6,067,553 A | 5/2000 | Downs et al. | |
| 6,555,186 B2 | 4/2003 | Hirschmann et al. | |
| 6,820,094 B1* | 11/2004 | Ferguson | G06F 16/93 |
| | | | 707/999.2 |
| 7,039,864 B1* | 5/2006 | Piersol | G06F 16/93 |
| | | | 715/210 |
| 7,526,555 B2* | 4/2009 | Shahindoust | G07F 17/0014 |
| | | | 709/227 |
| 7,747,949 B2* | 6/2010 | Incertis Carro | G06F 40/169 |
| | | | 345/173 |
| 8,555,186 B2* | 10/2013 | Sahai | G06F 40/166 |
| | | | 715/788 |
| 8,566,711 B1* | 10/2013 | Srivastava | G06F 40/197 |
| | | | 715/273 |
| 9,122,666 B2* | 9/2015 | Kerry-Tyerman | G06Q 10/10 |
| 9,319,623 B2* | 4/2016 | Ogawa | H04N 21/4753 |
| 9,460,226 B2* | 10/2016 | Leroy | G06F 16/958 |
| 9,588,971 B2 | 3/2017 | Hartmann et al. | |
| 9,785,627 B2 | 10/2017 | Campanelli | |
| 9,811,728 B2 | 11/2017 | King et al. | |
| 2002/0118379 A1* | 8/2002 | Chakraborty | G06F 40/30 |
| | | | 358/1.9 |
| 2003/0042319 A1* | 3/2003 | Moore | G06V 30/416 |
| | | | 235/494 |
| 2003/0217052 A1* | 11/2003 | Rubenczyk | G06F 16/951 |
| 2005/0210009 A1* | 9/2005 | Tran | H04L 63/08 |
| 2006/0048043 A1 | 3/2006 | Kikuchi | |
| 2006/0122983 A1 | 6/2006 | King et al. | |
| 2006/0277160 A1 | 12/2006 | Singh et al. | |
| 2008/0201190 A1* | 8/2008 | Compton | G06Q 40/02 |
| | | | 707/999.107 |
| 2009/0019360 A1 | 1/2009 | Lynggaard et al. | |
| 2009/0164881 A1* | 6/2009 | Segarra | G06V 10/22 |
| | | | 715/256 |
| 2010/0228721 A1* | 9/2010 | Mok | G16H 10/60 |
| | | | 707/711 |
| 2011/0145691 A1 | 6/2011 | Noyes | |
| 2011/0252311 A1* | 10/2011 | Kay | G06F 16/9562 |
| | | | 715/255 |
| 2012/0047090 A1 | 2/2012 | Gunther | |
| 2012/0200487 A1 | 8/2012 | Dvorak et al. | |
| 2013/0238689 A1* | 9/2013 | Matsushima | H04L 67/01 |
| | | | 709/203 |
| 2015/0036056 A1* | 2/2015 | Ogawa | G06F 15/167 |
| | | | 348/744 |
| 2015/0205777 A1 | 7/2015 | Campanelli | |
| 2015/0220497 A1* | 8/2015 | Kutilek | G06F 3/0482 |
| | | | 715/208 |
| 2015/0220520 A1* | 8/2015 | Hartmann | G06F 40/205 |
| | | | 707/742 |

FOREIGN PATENT DOCUMENTS

| | | |
|---|---|---|
| JP | H11203282 A | 7/1999 |
| JP | 2006260570 A | 9/2006 |
| JP | 2006350551 A | 12/2006 |
| JP | 2009026122 A | 2/2009 |
| JP | 2011065621 A | 3/2011 |
| WO | 2001022284 A3 | 8/2002 |
| WO | 2005066834 A1 | 7/2005 |

OTHER PUBLICATIONS

PCT Notification of Transmittal of the International Search Report and the Written Opinion of the International Searching Authority, dated Apr. 15, 2015, 9 pages.

* cited by examiner

METHOD FOR AUTOMATICALLY INDEXING AN ELECTRONIC DOCUMENT

CROSS-REFERENCE TO RELATED APPLICATIONS

This patent application is a continuation of and claims the benefit of priority to U.S. application Ser. No. 16/037,826, filed Jul. 17, 2018, now U.S. Pat. No. 10,976,899, issued Apr. 13, 2021, which is a continuation of and claims the benefit of priority to U.S. application Ser. No. 15/411,844, filed Jan. 20, 2017, now U.S. Pat. No. 10,055,098, issued Aug. 21, 2018, which is a divisional of and claims the benefit of priority to U.S. application Ser. No. 14/171,300, filed Feb. 3, 2014, now U.S. Pat. No. 9,588,971, issued Mar. 7, 2017, the entireties of which are incorporated herein by reference.

STATEMENT RE: FEDERALLY SPONSORED RESEARCH/DEVELOPMENT

Not Applicable

BACKGROUND

1. Technical Field

The present disclosure relates generally to electronic document management, and more particularly, to generating, automatically without user intervention, unique document page identifiers from content within a selected page region.

2. Related Art

The creation, distribution, and management of information are core functions of business. Information or content can be presented in a variety of different ways, including word processing documents, spreadsheets, graphics, photographs, engineering drawings, architectural plans, and so forth. In electronic form, these are generally referred to as documents, and may be generated and manipulated by computer software applications that are specific thereto. The workflows of creating, reviewing, and/or editing electronic documents have evolved to accommodate the specific requirements of various fields, though the need for a device-independent, resolution-independent file format led to the widespread adoption of the Portable Document Format (PDF), amongst other competing formats. Accordingly, different platforms having a wide variety of operating systems, application programs, and processing and graphic display capabilities can be accommodated regardless of the particulars of the workflow.

The PDF standard is a combination of a number of technologies, including a simplified PostScript interpreter subsystem, a font embedding subsystem, and a storage subsystem. As those in the art will recognize, PostScript is a page description language for generating the layout and the graphics of a document. Further, per the requirements of the PDF storage subsystem, all elements of the document, including text, vector graphics, and raster (bitmap) graphics, collectively referred to herein as graphic elements, are encapsulated into a single file. The graphic elements are not encoded to a specific operating system, software application, or hardware, but are designed to be rendered in the same manner regardless of the specificities relating to the system writing or reading such data. The cross-platform capability of PDF aided in its widespread adoption, and is now a de facto document exchange standard. Although originally proprietary, PDF has been released as an open standard published by the International Organization for Standardization (ISO) as ISO/IEC 3200-1:2008. Currently, PDF is utilized to encode a wide variety of document types, including those composed largely of text, and those composed largely of vector and raster graphics. Because of its versatility and universality, files in the PDF format are often preferred over more particularized file formats of specific applications.

In technical fields such as engineering and architecture, one project typically involves multiple aspects with numerous professionals spanning a wide range of disciplines. The planning documents, e.g., drawings, are specific to each discipline, though a change in one aspect may require a corresponding change in another aspect, and so on. For example, in a building construction project, there may be one set of plans for the structural aspect, while there may be another set of plans for the heating/ventilation/air conditioning (HVAC) aspect, and another set of plans for plumbing, another set for electrical, etc. A high level of detail is necessary in the planning documents to accurately convey the specifications of the project so that it can be correctly implemented. Although the ability to zoom in and zoom out of an electronic document alleviates this issue to a certain degree, the size and the amount of information contained in any one page must nevertheless remain manageable while retaining all the necessary detail so that viewing, editing, and annotating do not require complicated inputs/interface manipulations. Thus, the contents are separated into multiple pages.

In a typical set of drawings, whether stored in a PDF or otherwise, a standard convention is utilized to present, in an organized fashion, header information such as the title, drawing number, project name/identifier, facility identifier and/or address, measurement units, and so forth. This convention is typically the title block, which is usually positioned at the same location on each of the pages in the document. While this header information is useful when viewing the particular page on which it is located, it is a part of the document content itself, and cannot be used by the viewing/editing application to catalog and organize the document. The extent of any metadata that is stored in connection with a page is oftentimes limited to the page number relative to the other pages in the document, without any further descriptors.

Adding such descriptive information to label each page is a painstaking, error-prone, and time-consuming process that requires human intervention. After visually searching for and ascertaining the desired header information from the contents of each page, conventional processes require the manual keying of the same into a form field via the user interface of the editing application. The added metadata could thereafter be used for subsequent searching and organization purposes. The aforementioned procedure was required regardless of whether a bookmark was being created for a particular location on a page or a label was being applied to the page. Although labeling/bookmarking a document having only one or two pages may be trivial, typical project planning documents span many tens to hundreds of pages. Furthermore, the information from multiple different parts of the page could be needed for generating precise descriptors. For such larger, more complex documents, the time necessary to complete this task can increase to several hours.

Therefore, there is a need in the art for methods to generate, automatically without user intervention, unique document page identifiers from content within a selected page region.

BRIEF SUMMARY

The automatic generation of bookmarks or page labels on a multi-page document with text data extracted from the content of one or more regions of the document content is disclosed. In accordance with one embodiment of the present disclosure, there is a method for auto-indexing an electronic document stored on a computer and having multiple pages each having page content. The method may include receiving, from a user, a selection of a first region within a first one of the multiple pages of the document. The first region may be defined by a set of first boundaries relative to the first one of the multiple pages. Additionally, the first region may include a first base selection page content. The method may also include retrieving, without user intervention, a text string of the first base selection page content from the first one of the multiple pages. Furthermore, the method may include a step of assigning, without user intervention, the retrieved text string of the first base selection page content to a page location index that is associated with the first one of the multiple pages. There may also be a step of retrieving, without user intervention, a text string of a first replicated selection page content from a second one of the multiple pages. The first replicated selection page content may be included in the same first region defined by the set of first boundaries relative to the second one of the multiple pages. The method may also include assigning, without user intervention, the retrieved text string of the first replicated selection page content to a page location index of the second one of the multiple pages.

Another embodiment of the present disclosure contemplates a method for automatically applying labels to a plurality of pages in a document. The method may include receiving one or more page region selections on a first one of the plurality of pages. The page region selections may each include a label content within. There may also be a step of extracting, without user intervention, one or more label contents from a plurality of selected pages as text data. This may be based upon the respective one or more page region selections. The method may further include assigning the text data of the corresponding label content as a label for the page from which the particular label content was extracted.

Yet another embodiment is directed to a method for automatically generating bookmarks for a plurality of pages in a document. There may be a step of receiving one or more page location selections on a first one of the plurality of pages. The page location selections may each include a bookmark content within. The method may also include extracting, without user intervention, one or more bookmark contents from a plurality of selected pages as text data based upon the respective one or more page location selections. The method may further involve a step of generating bookmarks with the text data of the corresponding bookmark content for the page from which the particular label content was extracted.

Certain other embodiments of the present disclosure contemplate a non-transitory program storage medium readable by a data processor that tangibly embodies one or more programs of instructions executable by the data processor to perform the foregoing methods. The present disclosure will be best understood accompanying by reference to the following detailed description when read in conjunction with the drawings.

BRIEF DESCRIPTION OF THE DRAWINGS

These and other features and advantages of the various embodiments disclosed herein will be better understood with respect to the following description and drawings, in which.

Common reference numerals are used throughout the drawings and the detailed description to indicate the same elements.

DETAILED DESCRIPTION

The detailed description set forth below in connection with the appended drawings is intended as a description of the presently preferred embodiment methods for generating unique document page identifiers from content within a selected page region. It is not intended to represent the only form in which the present method may be developed or utilized. The description sets forth the functions and the sequence of steps for developing and operating the invention in connection with the illustrated embodiment. It is to be understood, however, that the same or equivalent functions and sequences may be accomplished by different embodiments that are also intended to be encompassed within the spirit and scope of the invention. It is further understood that the use of relational terms such as first, second, and the like are used solely to distinguish one from another entity without necessarily requiring or implying any actual such relationship or order between such entities.

Figure 1:
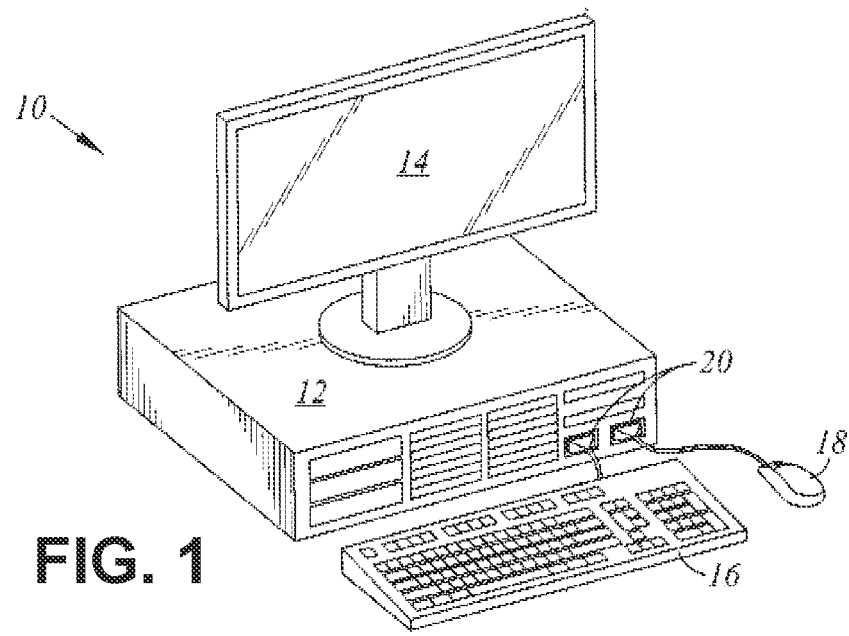
FIG. 1 is an exemplary computer system that may be capable to perform functions for use with aspects of the present invention including a display monitor.

FIG. 1 depicts an exemplary hardware environment in which various aspects of the contemplated method of document management and arrangement may be implemented. Generally, there is a computer system 10 with a system unit 12 and a display device 14. The display device 14 produced a graphical output from the data processing operations performed by the system unit 12. Input devices including a keyboard 16 and a mouse 18, for example, may be manipulated by a user to generate corresponding inputs to the data processing operations, and are connected to the system unit 12 via ports 20. Various other input and output devices may be connected to the system unit 12, and different interconnection modalities are known in the art.

Figure 2:
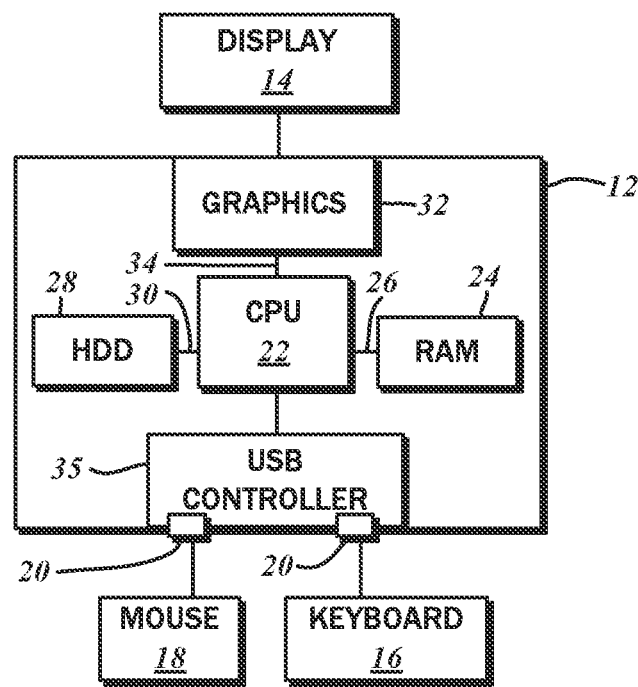
FIG. 2 is a block diagram of system components of the exemplary computer system of FIG. 1.

As shown in the block diagram of FIG. 2, the system unit 12 includes a processor (CPU) 22, which may be any conventional type. A system memory (RAM) 24 temporarily stores results of the data processing operations performed by the CPU 22, and is interconnected thereto typically via a dedicated memory channel 26. The system unit 12 may also include permanent storage devices such as a hard drive 28, which is also in communication with the CPU 22 over an input/output (I/O) bus 30. A dedicated graphics module 32 may also connected to the CPU 22 via a video bus 34, and transmits signals representative of display data to the display device 14. As indicated above, the keyboard 16 and the mouse 18 are connected to the system unit 12 over the port 20. In the embodiments where the port 20 is a USB type, there may be a USB controller 35 that translates data and instructions to and from the CPU 22 for the external peripherals connected via the port 20. Additional devices such as printers, microphones, speakers, and the like may be connected to the system unit 12 thereby.

The system unit 12 may utilize any operating system having a graphical user interface (GUI), such as WINDOWS from Microsoft Corporation of Redmond, Wash., MAC OS from Apple, Inc. of Cupertino, Calif., various versions of UNIX with the X-Windows windowing system, and so forth. The system unit 12 executes one or more computer programs, with the results thereof being displayed on the display device 14. Generally, the operating system and the computer programs are tangibly embodied in a computer-readable medium, e.g., the hard drive 28. Both the operating system and the computer programs may be loaded from the aforementioned data storage devices into the RAM 24 for execution by the CPU 22. The computer programs may comprise instructions, which, when read and executed by the CPU 22, cause the same to perform or execute the steps or features of the various embodiments set forth in the present disclosure.

According to one embodiment, a user can interact with the computer system 10, and specifically with the graphics being generated on the display device 14, via the mouse 18. The movement of a cursor generated on the display device 14 is tied to the movement of the mouse 18, with further interactivity being provided with input from the mouse buttons. Input from the keyboard 16 also provides interactivity with the computer system 10.

Although certain features of the present disclosure are described in relation to a computer system with such input and output capabilities, specifics thereof are presented by way of example only and not of limitation. Any alternative graphical user interfaces such as touch interfaces and pen/digitizer interfaces may be substituted. The analogs of those features will be readily appreciated, along with suitable modifications to accommodate these alternative interfaces while still achieving the same functionalities.

Along these lines, the foregoing computer system 10 represents only one exemplary apparatus of many otherwise suitable for implementing aspects of the present disclosure, and only the most basic of the components thereof have been described. It is to be understood that the computer system 10 may include additional components not described herein, and may have different configurations and architectures. Any such alternative is deemed to be within the scope of the present disclosure.

Again, the present disclosure is directed to a process for automatically generating bookmarks and/or page labels on a multi-page document by incorporating text from one or more selected regions on each page. This process may be implemented as a series of executable instructions in a document management software application. As utilized herein, the term document refers to standalone representation of data that can be opened, rendered and/or edited by such document management software application. Accordingly, the document may be formatted and structured in a particular way so that its elements can be rendered consistently. In the exemplary embodiment discussed herein, the document management software application handles PDF documents, and the following description will be in reference thereto. Documents in any other format that are editable or viewable with any other software application may be substituted.

Figure 3:
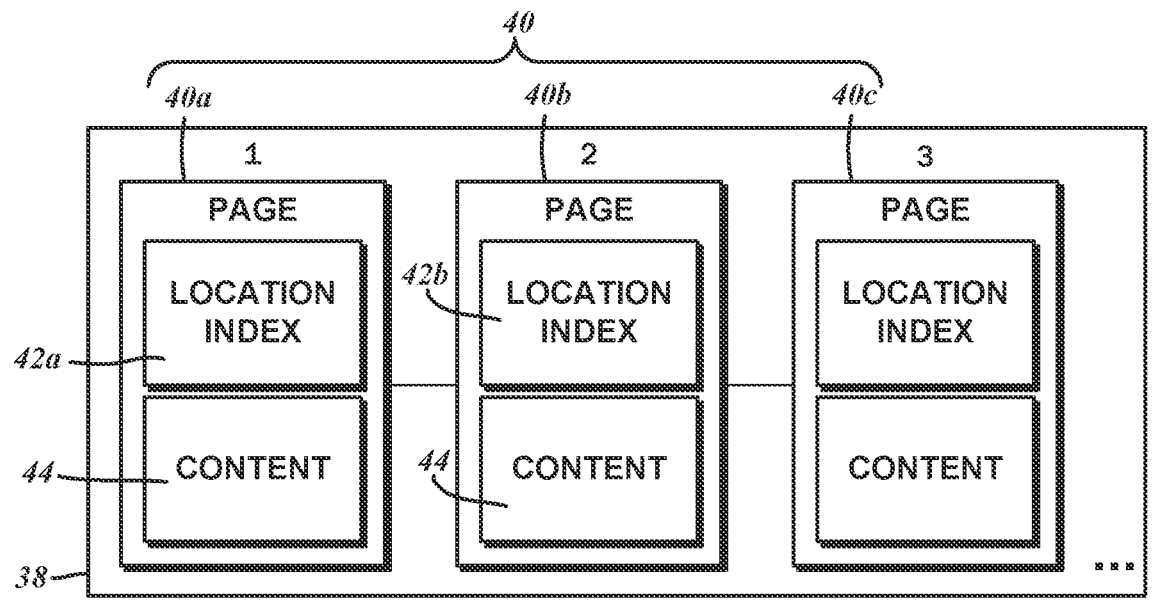
FIG. 3 is a diagram showing an exemplary structure of the document including multiple pages each with content and a location index.

With reference to the diagram of FIG. 3, according to various embodiments of the present disclosure, a document 38 is comprised of one or more pages 40. In the particular example, there is a first page 40a, a second page 40b, and a third page 40c. There could be additional pages 40, though these are not depicted in the diagram. Each of the pages has an associated location index 42 and content 44, and is ordered according to a numerical page number value. When the document is rendered within a user interface of the document management software application, the content 44 within the respective pages 40 may be presented in the order defined by the numerical page number value. Typically, a single document is stored in a single file on a hierarchical file system of the hard drive 28 or any other accessible storage device.

Figure 4:
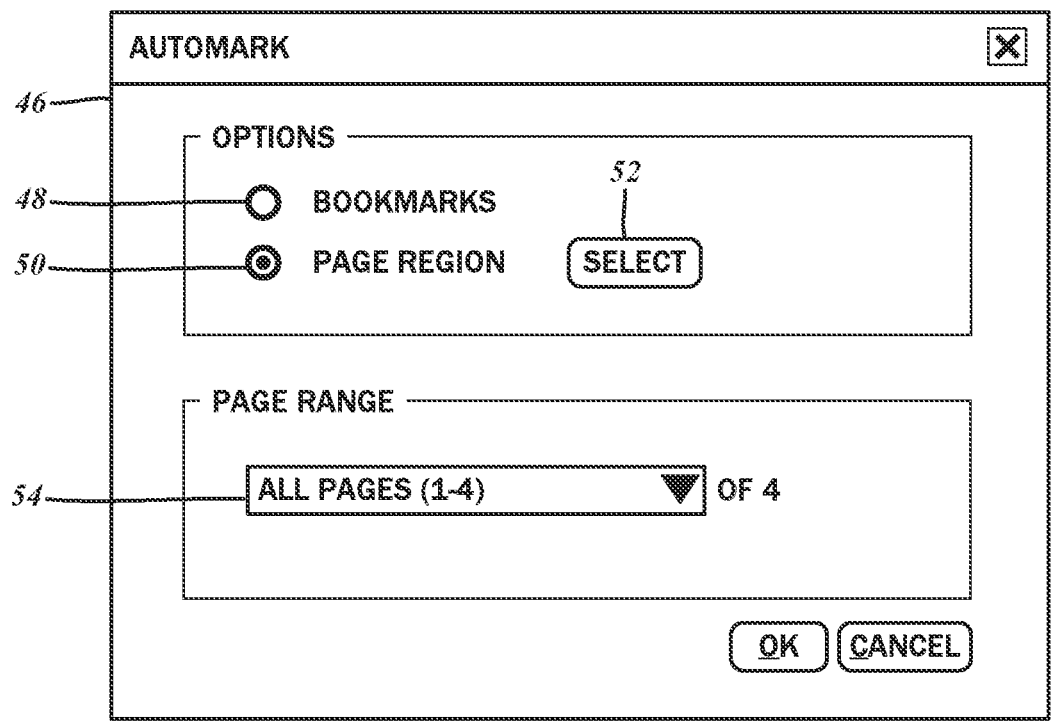
FIG. 4 is a dialog window of a user interface for a document management software application that implements various aspects of the contemplated methods for generating unique page identifiers from content within a selected page region, the dialog window including interface elements for defining the selected page region as well as interface elements for initiating the procedure to generate the unique page identifiers.

The contemplated process may begin with a precursor step of activating a dialog window 46 as shown in FIG. 4. There are two options presented: a first option 48 to generate page labels based on specific bookmarks that may be included in or appended to the pages 40, and a second option 50 to generate page labels based on a page region. The dialog window 46 may be invoked in various ways from other parts of the user interface of the document management software application. As will be described in more detail below, it is possible to select a region within the pages 40 from which the page labels are generated, and the specific selecting step is initiated by activating a select button 52. In addition, the range of pages over which the process is to be applied is selected via a dropdown menu 54. The default value may be all of the pages 40 in the document 38, though different ranges may be selected. The particulars of the dialog window 46 have been presented by way of example only and not of limitation, and any suitable interface may be presented to the user to initiate the process.

Figure 5B:
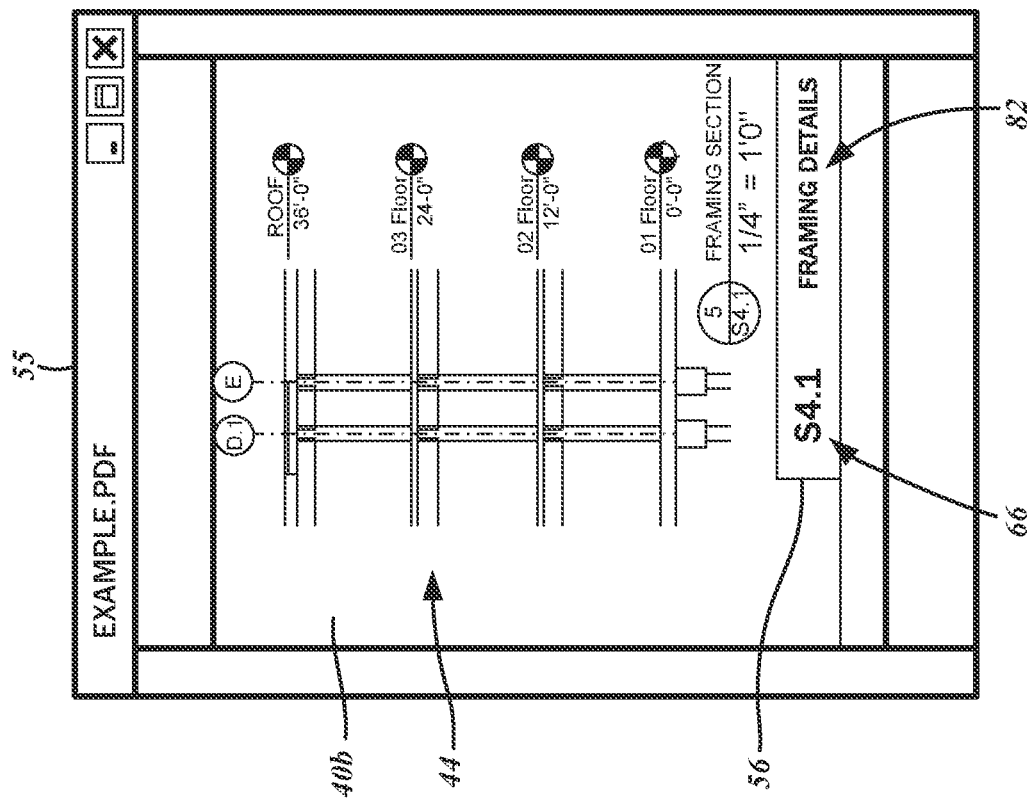
FIG. 5B is another excerpted section of the user interface for the document management software application in which a second one of the multiple pages of a document is rendered for viewing.
Figure 5A:
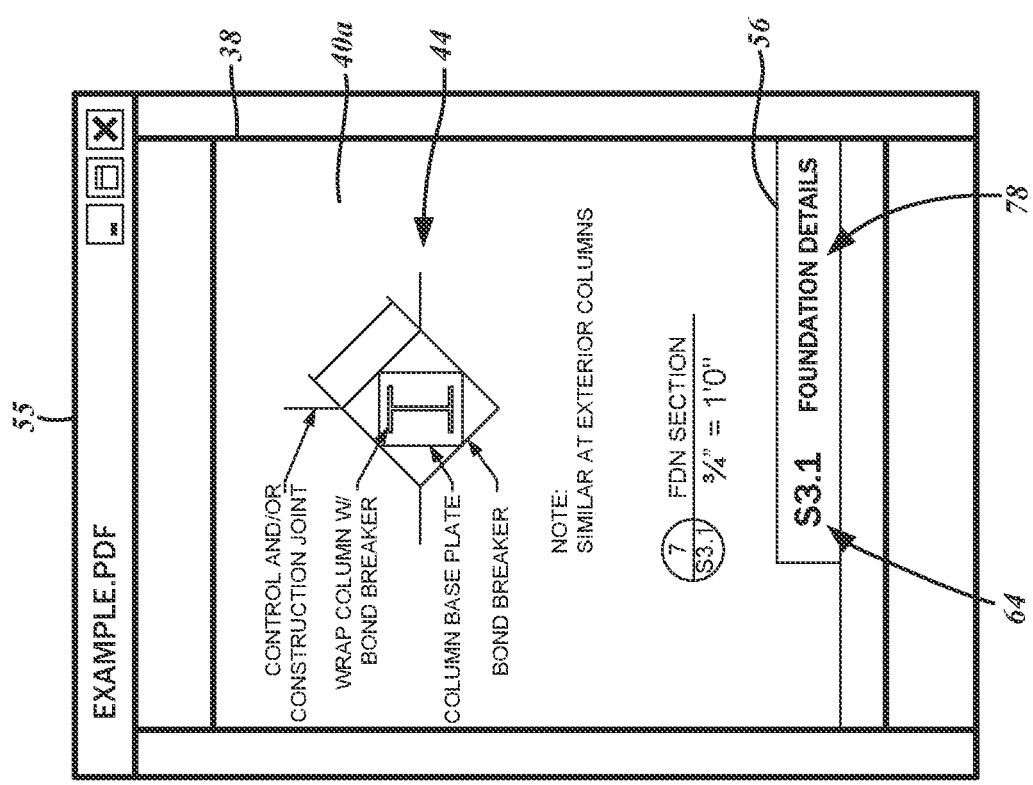
FIG. 5A is an excerpted section of the user interface for the document management software application showing a first one of the multiple pages of a document rendered for viewing.

FIG. 5A shows an excerpted section of the user interface for the document management software application, specifically referred to as a primary window 55. Within the primary window 55, the document 38, and more particularly, the first page 40a, is displayed with a rendering of the content 44 thereof. By way of example only and not of limitation, the content 44 may include a title block 56 with various information therein specific to the first page 40a. FIG. 5B again shows the primary window 55, but with the second page 40b of the document 38 being displayed with a rendering of the particular content 44 thereof. The content 44 likewise includes the title block 56, though with different information therein that pertains specifically to the second page 40b. It is understood that the position of the title block 56 relative to the first page 40a is the same as the position of the title block 56 relative to the second page 40b. In the title block 56 of the first page 40a, an example text "S3.1" and "Foundation Details" is included.

Figure 6:
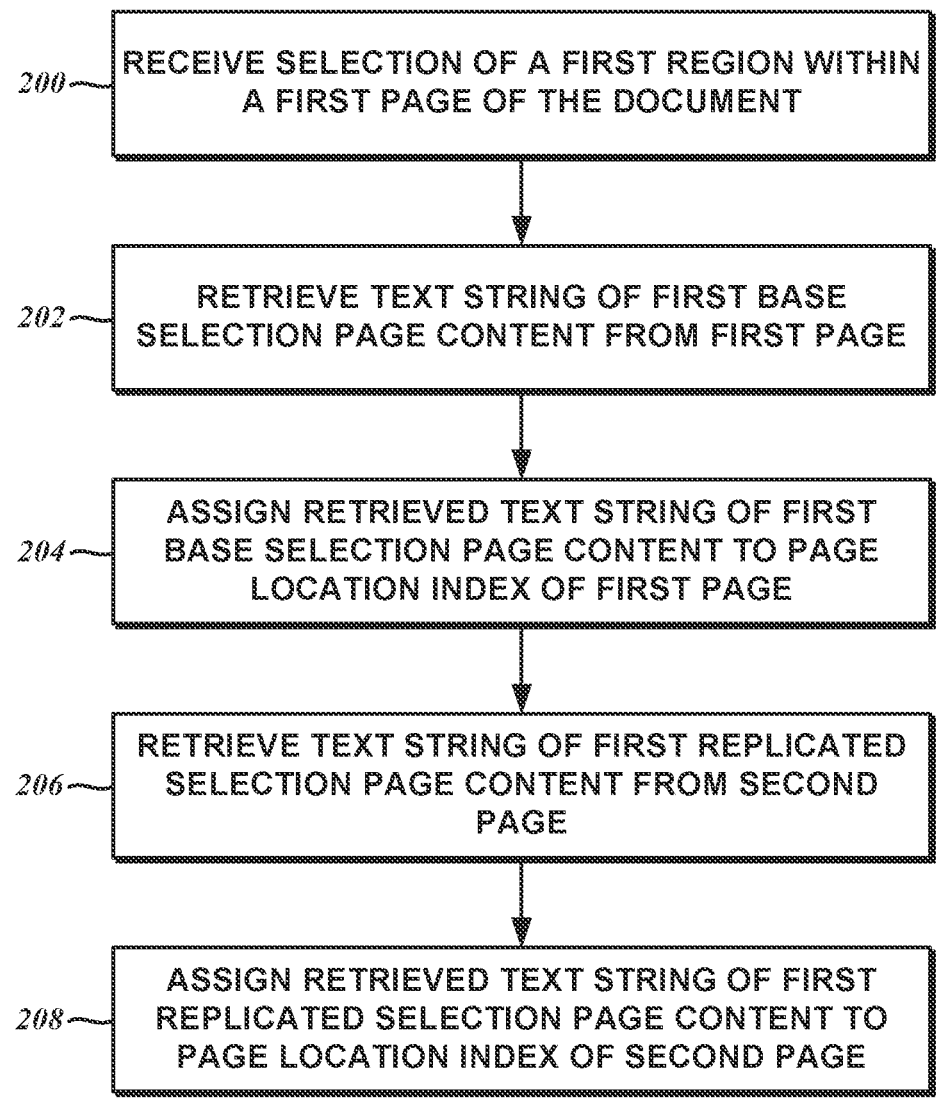
FIG. 6 is a flowchart depicting one embodiment of the method for generating unique page identifiers in accordance with the present disclosure.
Figure 7A:
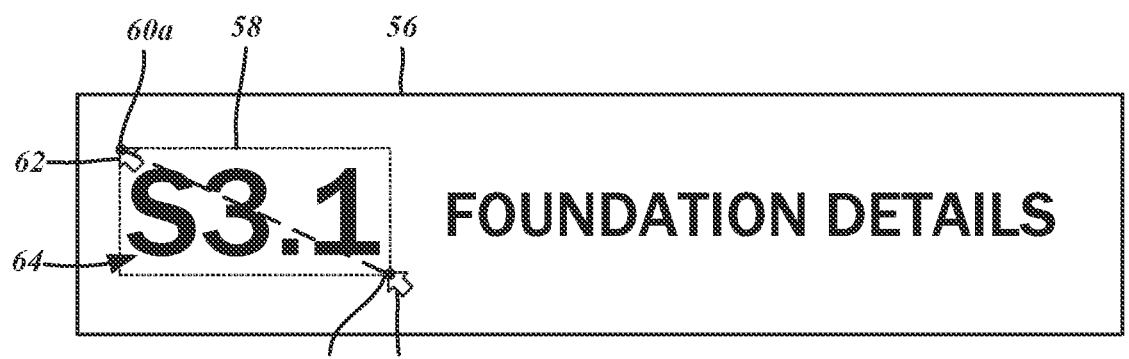
FIG. 7A illustrates one implementation for receiving the selection of a first page region.

Referring now to the flowchart of FIG. 6, a method for auto-indexing the document 38 stored on the computer system 10 proceeds with a step 200 of receiving a selection of a first region within a first page 40a of the document 38. This step may be initiated in response to detecting the activation of the select button 52 in the dialog window 46. As best shown in the enlarged view of the title block 56 in FIG. 7A, the first region 58 is defined by an upper left hand corner 60a and a diagonally opposed lower right hand corner 60b, and is therefore rectangular in shape. These boundaries are understood to be defined relative to the first page 40a. The first region 58, which encompasses the example text "S3.1", may be selected by positioning a mouse cursor 62 on the upper left hand corner 60a, clicking the mouse button, and dragging the mouse cursor 62 to the lower right hand corner 60b. In this regard, the selected content, e.g., the example text "S3.1" may also be referenced as a first base selection page content 64. Other ways for selecting a region on a graphical user interface are known, and such alternatives are deemed to be within the scope of the present disclosure. For instance, a multi-segment polygon could be a basis for selecting the region by designating each polygon segment graphically. In the context of a method particular to applying page labels as well as a method for generating bookmarks, the step 200 is understood to correspond to receiving one or more page region selections on a first one of the plurality of pages 40 that each include a label or bookmark content, respectively, within.

The method continues with a step 202 of retrieving, without user intervention, a text string of the first base selection page content 64 from the first page 40a. The first base selection page content 64 may be stored as basic text/character data within the document 38. In such case, this retrieving step may involve extracting such underlying text data that is determined to be positioned within the first region 58. Alternatively, the first page selection page content 64 may be stored as a vector or raster graphic. If this is the case, the retrieving step may further include parsing such content with an optical character recognition (OCR) module to generate the corresponding text string. The OCR module is externally called from the document management software application, and is seamlessly integrated therewith. For a method particular to applying page labels or a method for generating bookmarks, the step 202 corresponds to extracting, without user intervention, one or more label or bookmark contents, respectively, from a plurality of selected pages as text data. The specific text data that is extracted is based on page location selections that were made by the user in a previous step.

The retrieved text string of the first base selection page content 64 is then assigned, without user intervention, to the page location index 42a associated with the first page 40a in accordance with a step 204 of the method. The page location index 42a is understood to be, for example, a page label metadata that serves as a descriptor of the first page 40a for organization and searching purposes. Alternatively, the page location index 42 may be a bookmark that is appended to the first page 40a. The step 204 is understood to be a corollary to assigning the text data of the label or bookmark content to the particular page from which the particular text data was extracted in the earlier step directed in the methods for automatically applying labels or generating bookmarks.

The aforementioned procedure is repeated for each subsequent page 40 that is part of the selected page range of the document 38. In particular, the method includes a step 206 of retrieving, without user intervention, a text string of a first replicated selection page content 66. As indicated above, the user designates a selection of the first region 58, though in the spatial context of the first page 40a. The underlying text or image data found in the same first region 58 as defined by the same boundaries but in the spatial context of the second page 40b is retrieved. The data is parsed by the OCR engine as necessary to retrieve the text string. The example shown in FIG. 5B is that of the second page 40b, and the same region that was originally selected from the first page 40a includes the text "S4.1." According to a step 208, the method includes assigning, without user intervention, the retrieved text string of the first replicated selection page content 66 to a page location index 42b associated with the second page 40b. Thus, different content from the same part of each different page 40 may be assigned as the page location index 42. e.g., the corresponding page label or a bookmark linked to the page.

Figure 8:
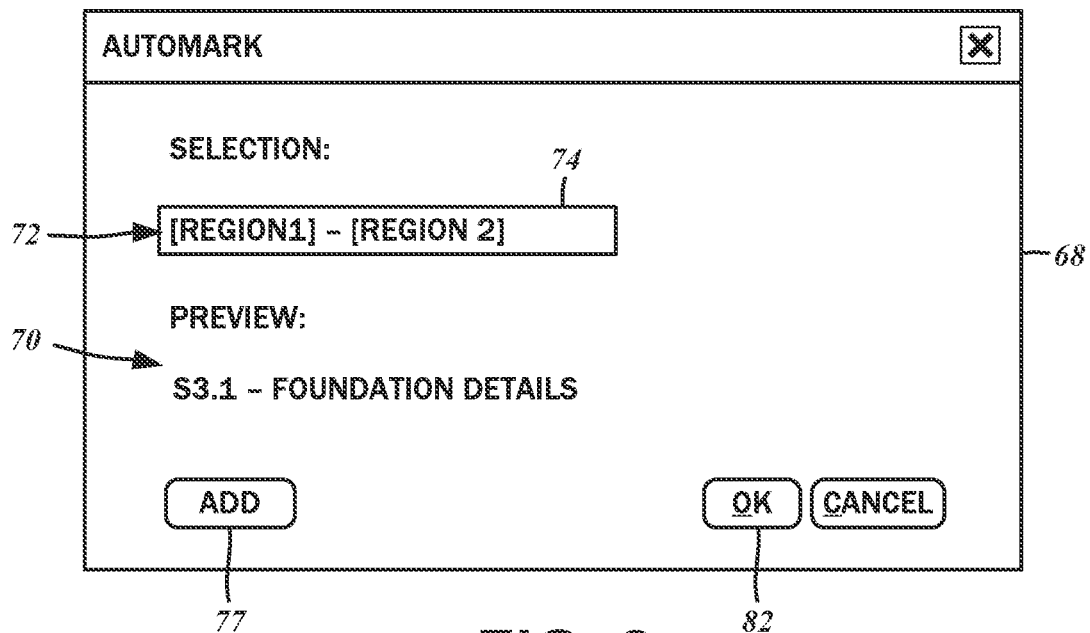
FIG. 8 is another dialog window of a user interface for the document management software application, the dialog window including interface elements for defining the selected page region as well as interface elements for initiating the procedure to generate the unique page identifiers.

Before committing the assignments of the respective text strings retrieved from the first base selection page content 64 and the first replicated selection page content 66 to the respective page location indices 42 a preview of the retrieved text strings from the selection of the first region 58 may be presented. Referring to FIG. 8, an exemplary dialog window 68 may be displayed in response to activating select button 52 from the dialog window 46. The dialog window 68 includes a preview 70 of the text string as would be assigned to the page location index 42.

Along these lines, it is envisioned that the user may define the format of the page location index 42. Thus, it is possible to specify a formatting structure 72 in a text input field 74. Keywords corresponding to the selected first region 58, also referred to as field codes, may be designated with surrounding brackets [ ]. The preview 70, as well as any assignment of the text string to the page location index 42 may follow the formatting as designated by the formatting structure 72. This involves substituting the field code with the actual retrieved text string, and retaining all other additional custom text including delimiters and the arrangement thereof as specified in the text input field 74.

Figure 7B:
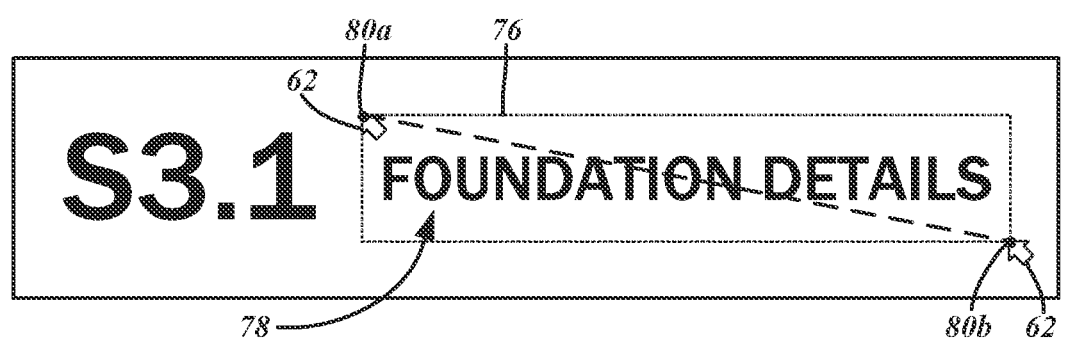
FIG. 7B illustrates receiving the selection of a second page region.

As shown in the text input field 74, it is possible to select the first region 58 of the first page 40a for assigning the underlying content as the page location index 42. With reference to FIG. 7B, it is also possible to select an additional second region 76 on the first page 40a for repeating the same procedure. Once the first region 58 has been selected, the dialog window 68 is presented again. By activating an add button 77, the display of the document 38 as shown in FIG. 5A returns, and the user can select the different second region 76 that includes a second base selection page content 78. The second region 76 is defined by an upper left hand corner 80a and a diagonally opposed lower right hand corner 80b, and is therefore rectangular in shape. These boundaries are also defined relative to the first page 40a. The second region 76, which encompasses the example text "Foundation Details", may be selected by positioning the mouse cursor 62 on the upper left hand corner 80a, clicking the mouse button, and dragging the mouse cursor 62 to the lower right hand corner 80b. The selected content, e.g., the example text "Foundation Details" is understood to be the aforementioned second base selection page content.

When such second region 76 is selected, as shown in the dialog window 68 of FIG. 8, the formatting structure 72 also includes a reference thereto, similarly designated by surrounding brackets [ ]. The formatting structure 72 can further incorporate field delimiters such as a space character, a dash character, or any other suitable character that visually separates the reference to the first region and the reference to the second region.

The text string of the underlying second base selection page content 78 is retrieved in accordance with the procedures outlined above, and shown in the preview 70. After all of the desired regions on the first page 40a are selected, the aforementioned procedure of retrieving the replicated selection page content and assigning the text string to the respective page location index 42 is repeated for each selected region, and concatenated as defined by the formatting structure 72. As shown in FIG. 5B, when processing the second page 40b, the particular content that is positioned at the same relative location as the second region 76, that is, a second replicated selection page content 82, is retrieved. That is, the data from the same regions on subsequent pages are used to generate the page location index 42. e.g., the bookmark or page label, for the corresponding page 40. The processing of the pages 40 is initiated once the "OK" button 84 from the dialog window 68 is activated.

The particulars shown herein are by way of example and for purposes of illustrative discussion of the embodiments of the present disclosure only and are presented in the cause of providing what is believed to be the most useful and readily understood description of the principles and conceptual aspects of the disclosure. In this regard, no attempt is made to show more details than is necessary for a fundamental understanding of the disclosure, the description taken with the drawings making apparent to those skilled in the art how the several forms of the presently disclosed methods may be embodied in practice.

What is claimed is:

1. A computer-implemented method of automatically indexing an electronic document comprising a plurality of pages, the method comprising:
   receiving, via a graphical user interface, a selection of a first page region within a first page of the electronic document, the first page region represented by a first set of boundary locations relative to the first page;
   extracting a first text string from the first page region;
   assigning the first text string to a page location index of the first page;
   generating subsequent page regions in subsequent pages of the electronic document by applying the first set of boundary locations to each of the subsequent pages;
   extracting subsequent text strings from the subsequent page regions in the subsequent pages; and
   assigning the subsequent text strings extracted from the subsequent page regions to corresponding page location indices of the subsequent pages.

2. The computer-implemented method of claim 1, further comprising:
   receiving, via the graphical user interface, a designation of pages from the plurality of pages from which the first and subsequent text strings are extracted.

3. The computer-implemented method of claim 1, further comprising:
   receiving, via the graphical user interface, a selection of a page label or a bookmark.

4. The computer-implemented method of claim 3, wherein, based on the selection of the page label or the bookmark, the extracted first and subsequent text strings form page labels or bookmark contents for the first and subsequent pages of the electronic document.

5. The computer-implemented method of claim 1, wherein the first set of boundary locations are defined by a multi-segment polygon input by a user via the graphical user interface.

6. The computer-implemented method of claim 1, wherein the extracted first string is displayed as a preview before assigning the first text string to the page location index of the first page.

7. The computer-implemented method of claim 6, wherein the first text string is assigned to the page location index of the first page upon a user approving the extracted first string displayed as the preview.

8. A system comprising:
   at least one processor; and
   at least one storage storing instructions which, when executed by the at least one processor, cause the at least one processor to perform operations for automatically indexing an electronic document comprising a plurality of pages, the operations comprising:
   receiving, via a graphical user interface, a selection of a first page region within a first page of the electronic document, the first page region represented by a first set of boundary locations relative to the first page;
   extracting a first text string from the first page region;
   assigning the first text string to a page location index of the first page;
   generating subsequent page regions in subsequent pages of the electronic document by applying the first set of boundary locations to each of the subsequent pages;
   extracting subsequent text strings from the subsequent page regions in the subsequent pages; and
   assigning the subsequent text strings extracted from the subsequent page regions to corresponding page location indices of the subsequent pages.

9. The system of claim 8, the operations further comprising:
   receiving, via the graphical user interface, a designation of pages from the plurality of pages from which the first and subsequent text strings are extracted.

10. The system of claim 8, the operations further comprising:
   receiving, via the graphical user interface, a selection of a page label or a bookmark.

11. The system of claim 10, wherein, based on the selection of the page label or the bookmark, the extracted first and subsequent text strings form page labels or bookmark contents for the first and subsequent pages of the electronic document.

12. The system of claim 8, wherein the first set of boundary locations are defined by a multi-segment polygon input by a user via the graphical user interface.

13. The system of claim 8, wherein the extracted first string is displayed as a preview before assigning the first text string to the page location index of the first page.

14. The system of claim 13, wherein the first text string is assigned to the page location index of the first page upon a user approving the extracted first string displayed as the preview.

15. A non-transitory computer readable medium storing instructions which, when executed by at least one processor, cause the at least one processor to perform operations for automatically indexing an electronic document comprising a plurality of pages, the operations comprising:
   receiving, via a graphical user interface, a selection of a first page region within a first page of the electronic document, the first page region represented by a first set of boundary locations relative to the first page;
   extracting a first text string from the first page region;
   assigning the first text string to a page location index of the first page;
   generating subsequent page regions in subsequent pages of the electronic document by applying the first set of boundary locations to each of the subsequent pages;
   extracting subsequent text strings from the subsequent page regions in the subsequent pages; and
   assigning the subsequent text strings extracted from the subsequent page regions to corresponding page location indices of the subsequent pages.

16. The non-transitory computer readable medium of claim 15, the operations further comprising:
   receiving, via the graphical user interface, a designation of pages from the plurality of pages from which the first and subsequent text strings are extracted.

17. The non-transitory computer readable medium of claim 15, the operations further comprising:
   receiving, via the graphical user interface, a selection of a page label or a bookmark.

18. The non-transitory computer readable medium of claim 17, wherein, based on the selection of the page label or the bookmark, the extracted first and subsequent text strings form page labels or bookmark contents for the first and subsequent pages of the electronic document.

19. The non-transitory computer readable medium of claim 15, wherein the first set of boundary locations are defined by a multi-segment polygon input by a user via the graphical user interface.

20. The non-transitory computer readable medium of claim 15, wherein the extracted first string is displayed as a preview before assigning the first text string to the page location index of the first page.

\* \* \* \* \*